(12) United States Patent
Zaslavsky et al.

(10) Patent No.: US 9,330,416 B1
(45) Date of Patent: May 3, 2016

(54) VISUALIZATION OF FRAUD PATTERNS

(71) Applicant: EMC Corporation, Hopkinton, MA (US)

(72) Inventors: Alex Zaslavsky, Petah Tiqwa (IL); Daniel Hassan, Ra'anana (IL); Yafit Levi-Maor, Even Yehuda (IL); Liron Liptz, Even Yehuda (IL); Anatoly Gendelev, Rechovot (IL)

(73) Assignee: EMC Corporation, Hopkinton, MA (US)

( * ) Notice: Subject to any disclaimer, the term of this patent is extended or adjusted under 35 U.S.C. 154(b) by 39 days.

(21) Appl. No.: 14/144,019

(22) Filed: Dec. 30, 2013

(51) Int. Cl.
| | |
|---|---|
| *G07B 17/00* | (2006.01) |
| *G07F 19/00* | (2006.01) |
| *G06Q 40/00* | (2012.01) |
| *G06F 7/04* | (2006.01) |
| *G06F 15/16* | (2006.01) |
| *G06F 17/30* | (2006.01) |
| *G06Q 10/00* | (2012.01) |
| *G06Q 40/04* | (2012.01) |
| *G06Q 20/10* | (2012.01) |
| *G06Q 20/00* | (2012.01) |
| *G06Q 40/02* | (2012.01) |
| *G06F 21/00* | (2013.01) |

(52) U.S. Cl.
CPC .............. *G06Q 40/12* (2013.12); *G06Q 10/00* (2013.01); *G06Q 40/00* (2013.01); *G06Q 40/04* (2013.01); *G06F 21/00* (2013.01); *G06Q 20/00* (2013.01); *G06Q 20/10* (2013.01); *G06Q 40/02* (2013.01)

(58) Field of Classification Search
CPC ....... G06Q 10/00; G06Q 40/00; G06Q 50/00; G06Q 20/4016; G06Q 50/01; G06Q 20/04; G06Q 40/12; G06Q 20/20; G06Q 20/027; G06Q 20/227; G06Q 40/02; G06Q 20/4014; G06N 5/04; G06N 5/048; G06N 7/005; G06K 5/00; G06F 21/552
USPC .................. 715/215; 705/30, 35, 44, 38, 39; 706/52; 235/375, 380; 726/22, 28
See application file for complete search history.

(56) References Cited

U.S. PATENT DOCUMENTS

| | | | | |
|---|---|---|---|---|
| 7,793,835 | B1 * | 9/2010 | Coggeshall et al. | .. G06F 21/552 235/375 |
| 8,674,993 | B1 * | 3/2014 | Fleming et al. | ........ G06Q 40/06 345/440 |

(Continued)

OTHER PUBLICATIONS

Gao, Z., & Ye, M. (2007). A framework for data mining-based anti-money laundering research. Journal of Money Laundering Control, 10(2), 170-179. doi:http://dx.doi.org/10.1108/13685200710746875.*

(Continued)

*Primary Examiner* — Olusegun Goyea
(74) *Attorney, Agent, or Firm* — BainwoodHuang (57) ABSTRACT

An improved technique involves identifying other transactions for investigation from entries in a database that involve a particular actor involved in a known fraudulent transaction. From a transaction log listing transactions, a server generates a database of transaction entries which identify transactions from the transaction log, each transaction entry (i) describing an activity and (ii) identifying a set of actors involved in that activity. Based on a known fraudulent transaction involving a particular actor, the server finds a set of transaction entries from the database which involve the particular actor. From the found set of transaction entries, the server identifies other transactions for investigation.

21 Claims, 5 Drawing Sheets

(56) References Cited

U.S. PATENT DOCUMENTS

| | | | | |
|---|---|---|---|---|
| 8,805,737 B1* | 8/2014 | Chen et al. | ............ | G06Q 40/02 235/380 |
| 2005/0222929 A1* | 10/2005 | Steier et al. | ............ | G06Q 40/02 705/35 |
| 2008/0021801 A1 | 1/2008 | Song et al. | | |
| 2010/0169137 A1* | 7/2010 | Jastrebski et al. | ...... | G06Q 20/04 715/215 |
| 2011/0142217 A1* | 6/2011 | Goldfarb | ............ | H04M 15/00 379/126 |
| 2012/0159647 A1* | 6/2012 | Sanin et al. | ............. | H04L 51/32 726/28 |
| 2013/0110722 A1 | 5/2013 | Boding | | |
| 2013/0305356 A1* | 11/2013 | Cohen-Ganor et al. | ...................... | G06Q 40/00 726/22 |
| 2013/0325787 A1* | 12/2013 | Gerken et al. | ......... | G06N 7/005 706/52 |
| 2014/0040086 A1* | 2/2014 | Abbatiello | ......... | G06Q 20/4016 705/35 |
| 2014/0053254 A1* | 2/2014 | Sun et al. | ................. | G06F 21/36 726/7 |
| 2014/0108251 A1* | 4/2014 | Anderson et al. | .. | G06Q 20/4016 705/44 |
| 2014/0237570 A1* | 8/2014 | Shishkov et al. | ..... | G06F 21/316 726/7 |
| 2014/0365358 A1* | 12/2014 | Higaki | ................. | G06Q 20/027 705/39 |

OTHER PUBLICATIONS

Cowell, R. G. Verrall, R. J., & Yoon, Y. K. (2007). Modeling Operational Risk With Bayesian Networks. Journal of Risk and Insurance, 74(4), 795-827. Retrieved from http://search.proquest.com/docview/226937132?accountid=14753.*

* cited by examiner

VISUALIZATION OF FRAUD PATTERNS

BACKGROUND

Some online banks use adaptive authentication. Such risk-based authentication systems assign risk scores to banking transactions where higher risk scores indicate higher risk.

Some adaptive authentication systems periodically send customer transactions that have high risk scores to fraud analysts. These fraud analysists, in the course of conventional fraud investigations, manually investigate some or all of these transactions. In some situations, the fraud analysts feed results of the investigations back to the adaptive authentication system as part of a machine learning process.

SUMMARY

Unfortunately, there are deficiencies with the above-described conventional fraud investigations. For example, as such fraud investigations involve manual analysis, the scope of fraud investigations may be limited. Along these lines, consider an example in which a fraud analyst investigates transactions involving a particular individual. While the analyst may find further instances of fraud involving this particular individual, it may be too difficult for the analyst to find other, related transactions for investigation.

In contrast with the above-described conventional fraud investigations that may limit the scope of fraud investigations, an improved technique involves identifying other transactions for investigation from entries in a database that involve a particular actor involved in a known fraudulent transaction. From a transaction log listing transactions, a server generates a database of transaction entries which identify transactions from the transaction log, each transaction entry (i) describing an activity and (ii) identifying a set of actors involved in that activity. Based on a known fraudulent transaction involving a particular actor, the server finds a set of transaction entries from the database which involve the particular actor. From the found set of transaction entries, the server identifies other transactions for investigation.

Advantageously, the improved technique enables fraud analysts to widen the scope of fraud investigations. The server achieves this by locating transactions based on relationships of actors involved in such transactions to actors involved in fraudulent transactions. The server is able to determine these relationships because it makes use of database technology. In some arrangements, the database is a graph database having edges that represent the relationships between actors in common transactions; a fraud analyst using such a tool may be able to quickly visualize other transactions for investigation that a manual analysis is likely to miss.

One embodiment of the improved technique is directed to a method of providing security. The method includes generating, from a transaction log listing transactions, a database of transaction entries which identify transactions from the transaction log, each transaction entry (i) describing an activity and (ii) identifying a set of actors involved in that activity. The method also includes finding, based on a known fraudulent transaction involving a particular actor, a set of transaction entries from the database which involve the particular actor. The method further includes identifying, from the found set of transaction entries, other transactions for investigation.

In some arrangements, generating the database of transaction entries includes assigning, for each actor of the set of actors involved in an activity, a node of a set of nodes of a graph structure to that actor. In such arrangements, for each pair of actors of the set of actors involved in the activity, an edge of a set of edges of the graph structure is assigned to that pair of actors, that pair of actors being connected by the edge. The nodes assigned to each of the set of actors involved in the activity and the edges assigned to each pair of actors of the set of actors involved in the activity are then produced as a transaction entry. The generated database is a graph database that includes the nodes and edges that are assigned to the actors of the set of actors involved in the activities described by the transaction entries.

In some arrangements, the method further includes assigning a particular node of the graph structure to the particular actor as being involved in the known fraudulent transaction, and marking the particular node so as to distinguish the particular node from other nodes of the graph database assigned to other actors of the set of actors that are not involved in the known fraudulent transaction.

In some arrangements, finding the set of transactions entries from the database which involve the particular actor includes locating particular edges terminating on the particular node. In such arrangements, identifying other transactions for investigation from the found set of transaction entries includes locating the other nodes of the graph database on which the particular edges terminate, the other nodes having been assigned to actors of the set of actors that are not involved in the known fraudulent transaction.

In some further arrangements, identifying the other transactions for investigation further includes finding activities in which other actors represented by the located other nodes are involved.

In some arrangements, each of the set of actors belongs to a group of a set of groups, each of the set of groups indicating a role that an actor belonging to that group plays in an activity in which the actor is involved. In such arrangements, locating the other nodes of the graph database on which the particular edges terminate includes generating a logical filter that represents a relationship between a first group of the set of groups and a second group of the set of groups, and locating nodes of the set of nodes assigned to actors of the set of actors that satisfy the relationship represented by the logical filter.

In some arrangements, the logical filter expresses a topological pattern involving nodes and edges within the graph database. In such arrangements, locating the nodes of the set of nodes representing the actors of the set of actors that satisfy the relationship represented by the logical filter includes performing a search operation within the graph database for nodes and edges that satisfy the topological pattern expressed by the logical filter.

In some arrangement, the method further includes receiving results of an investigation performed on a transaction identified for investigation, and transmitting the results of the investigation to a machine learning module of an authentication service that identifies the transactions listed in the received transaction log, the machine learning module being configured to adjust a methodology by which the authentication service identifies transactions for listing in subsequent transaction logs.

Additionally, some embodiments of the improved technique are directed to an apparatus constructed and arranged to provide security. The apparatus includes memory and a set of processors coupled to the memory to form controlling circuitry. The controlling circuitry is constructed and arranged to carry out a method of providing security.

Furthermore, some embodiments of the improved technique are directed to a computer program product having a non-transitory computer-readable storage medium which stores code including a set of instructions which, when executed by a data storage system, cause the data storage system to carry out a method of providing security.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves identifying other transactions for investigation from entries in a database that involve a particular actor involved in a known fraudulent transaction. From a transaction log listing transactions, a server generates a database of transaction entries which identify transactions from the transaction log, each transaction entry (i) describing an activity and (ii) identifying a set of actors involved in that activity. Based on a known fraudulent transaction involving a particular actor, the server finds a set of transaction entries from the database which involve the particular actor. From the found set of transaction entries, the server identifies other transactions for investigation.

Advantageously, the improved technique enables fraud analysts to widen the scope of fraud investigations. The improved technique achieves this by locating transactions based on relationships of actors involved in such transactions to actors involved in fraudulent transactions. The server is able to determine these relationships because it makes use of database technology. In some arrangements, the database is a graph database having edges that represent the relationships between actors in common transactions; a fraud analyst using such a tool may be able to quickly visualize other transactions for investigation that a manual analysis may miss.

Figure 1:
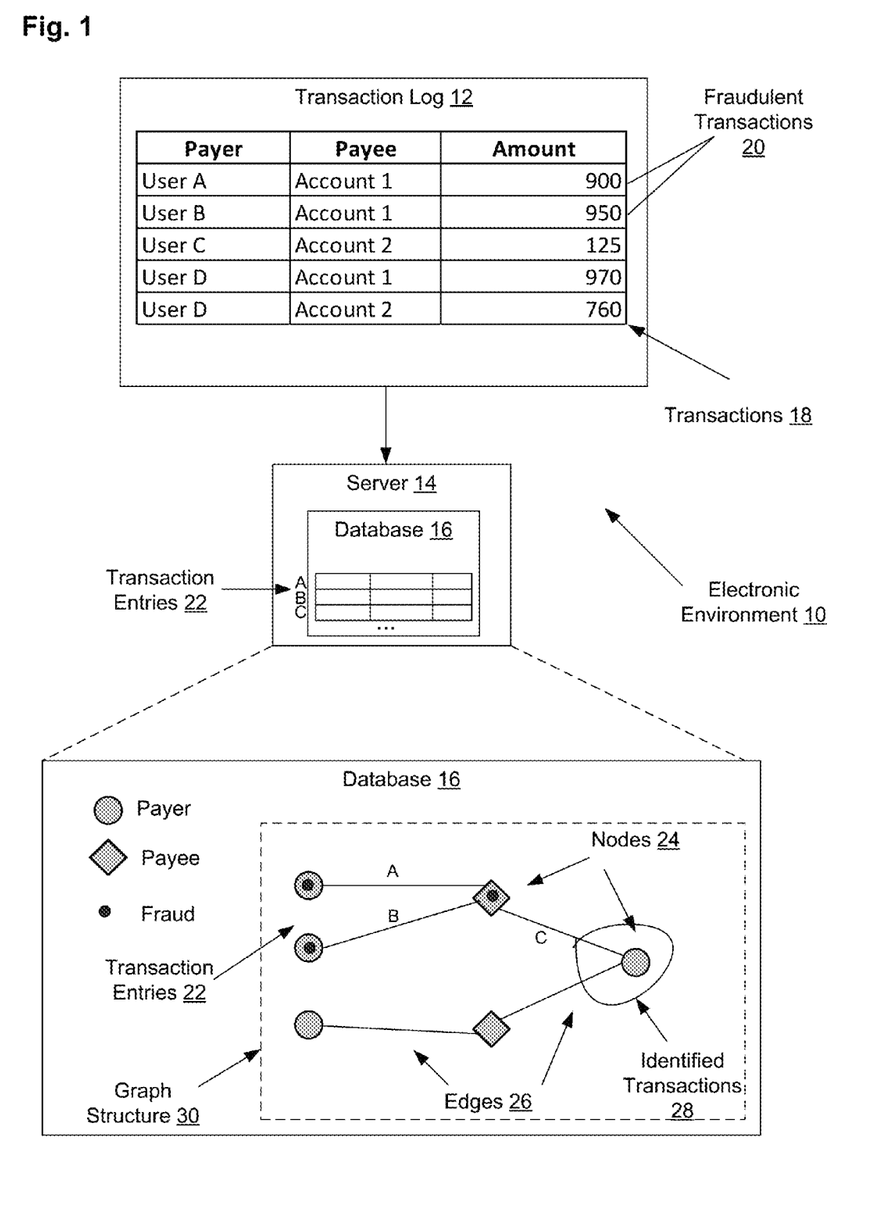
FIG. 1 is a block diagram illustrating an example electronic environment in which the improved technique may be carried out.

FIG. 1 illustrates an example electronic environment 10 in which the improved technique can be carried out. Electronic environment 10 includes a server 14 that is configured to receive a transaction log 12 from, e.g., an adaptive authentication server. Server 14 is further configured to generate database 16 of transaction entries 22 from information in transaction log 12. Server 14 is further configured to identify for further investigation transactions based on identifying actors involved in fraudulent transactions 20.

Transaction log 12 is typically an electronic file containing information related to a list of transactions 18. In one example, transactions 18 are those receiving sufficiently high risk scores from the adaptive authentication server to warrant further investigation. As illustrated in FIG. 1, the list of transactions includes such information as the actors involved (e.g., a payer who represents a source of money, a payee who represents a destination of the money), and the amount of money involved in the transaction. Information in transaction log 12 may be arranged according to some specified format, e.g., comma-separated values.

As illustrated in FIG. 1, some of the transactions 18 listed in transaction log 12 have already been determined to be fraudulent transactions 20. For example, existing processes executed by fraud analysts (e.g., receiving reports of stolen credit card numbers, calling account owners, etc.) have led the analysts to conclude that the transactions were conducted fraudulently. Along these lines, these processes involve marking the actors involved in such transactions as suspicious, and transactions involving these actors requiring investigation.

Database 16, as illustrated in FIG. 1, of transaction entries 22 is stored within server 14 once generated by server 14; in some arrangements, however, database 16 is stored remote from server 14. Database 16 is configured to store transaction entries 22 (e.g., A, B, C as illustrated in FIG. 1) upon generation by server 14. In some arrangements, and as illustrated in FIG. 1, database 16 is a graph database that expresses the actors involved in transactions 18 and the relationships between the actors as nodes and edges in a graph structure 30. In other arrangements, however, database 16 may be a relational database.

It should be understood that transaction entries 22 describe an activity and identify actors involved in the described activity. In a straightforward example, a transaction entry 22 might be a row of a spreadsheet (e.g., A, B, C) with field values of payer, payee, and transaction amount. Such an entry 22 would describe the activity of transferring the amount of money from the payer to the payee. When database 16 is a graph database, however, a transaction entry 22 includes a pair of nodes 24—one assigned to the payer, the other to the payee—and an edge 26 connecting the pair of nodes. In some arrangements, the edge may have an arrow denoting the direction of the transfer. In other arrangements, however (and as illustrated in FIG. 1), each of the actors fall into one of two categories such that the nodes 24 representing these categories of actors are different.

It should also be understood that graph structure 30 as illustrated in FIG. 1 is represented by a dotted-line box encompassing nodes 24 and edges 26 of transaction entities 22. Generally speaking, graph structure 30 is an abstract data type configured to implement graph concepts from graph theory. In this way, graph structure 30 includes a set of ordered pairs of nodes 24, which are edges 26.

During operation, server 14 generates database 16 containing transaction entries 22 from transaction log 12. In some arrangements, such a generation may involve the generation of fields representing the various actors and amounts. Transaction entries 22 would then be rows (e.g., A, B, C) of a matrix-like object having values of the fields taken from transactions 18 of transaction log 12. In some arrangements, there may be an additional field indicating whether the transaction described by transaction entry 22 is fraudulent.

In other arrangements, however, when generated database 16 is a graph database, server 14 assigns nodes from graph structure 30 to each actor in a transaction 18. In the example illustrated in FIG. 1, server 14 assigns, within transaction entry 22, a first node 24 to "User A" and a second node to "Account 1". Because these two actors are involved in the same transaction ("A"), server 14 assigns an edge 26 to terminate on each node 24 of this pair of nodes. Server 14 then assigns a new node 24 to "User B", and assigns another edge 26 between the node assigned to "User B" and "Account 1"; these actors are involved in the same transaction ("B"). Server 14 continues in this way with the rest of transactions 18 (e.g., "C") from transaction log 12 until the end of the file has been reached.

It should be understood that the actors in the example illustrated in FIG. 1 fall into one of two categories: a payer and a payee. For visualization purposes, for example, server 14 may assign one type of node 24 (circles) to the group of payers, and another type of node 24 (diamonds) to the group of payees. An advantage of using different types of nodes is that the resulting graph is clearer than if the direction of transfer of money was represented by an arrow.

In some arrangements, server 14 additionally considers fraudulent transactions 20 by marking the nodes assigned to actors involved in fraudulent transactions 20 so as to distinguish those nodes from nodes assigned to actors not involved in fraudulent transactions 20. In the example illustrated in FIG. 1, server 14 marks those nodes assigned to actors involved in fraudulent transactions 20 with a large dot inside the node. Note that both types of actors discussed in this example—payers and payees—may be marked in this manner.

Once server 14 generates database 16, server 14 identifies those actors not involved in fraudulent transactions 20, but having a relationship with actors involved in fraudulent transactions 20. Server 14 is able to do this via database 16 by locating all unmarked nodes 24 sharing an edge with a marked node 24. In the example illustrated in FIG. 1, the nodes representing "User A" and "User B" are marked as being involved in a fraudulent transaction, as is "Account 1". "User D", on the other hand, is not marked, even though it has a relationship with "Account 1".

Server 14 then identifies the transaction between "User D" and "Account 1" as an identified transaction for further investigation. In some arrangements, server 14 also transactions between a newly-identified node and other, non-marked nodes as warranting investigation, such as that between "User D" and "Account 2". In some arrangements, server 14 does not identify a transaction 18 when that transaction 18 is a certain distance from a marked node.

It should be understood that, in general usage, transactions 18 may be more complex than those illustrated in FIG. 1. For example, transactions 18 may involve more than one payer or payee, and may in fact have any number of either. Actors in transactions 18 may also include devices used to carry out transactions 18, cookies present on devices used to carry out transactions 18, and the like. In such a case, graph structure 30 may contain different types of nodes for each group of actors. Nevertheless, the above-described technique for identifying new transactions 28 for further investigation remains the same.

Further details of server 14 are described below in connection with FIG. 2.

Figure 2:
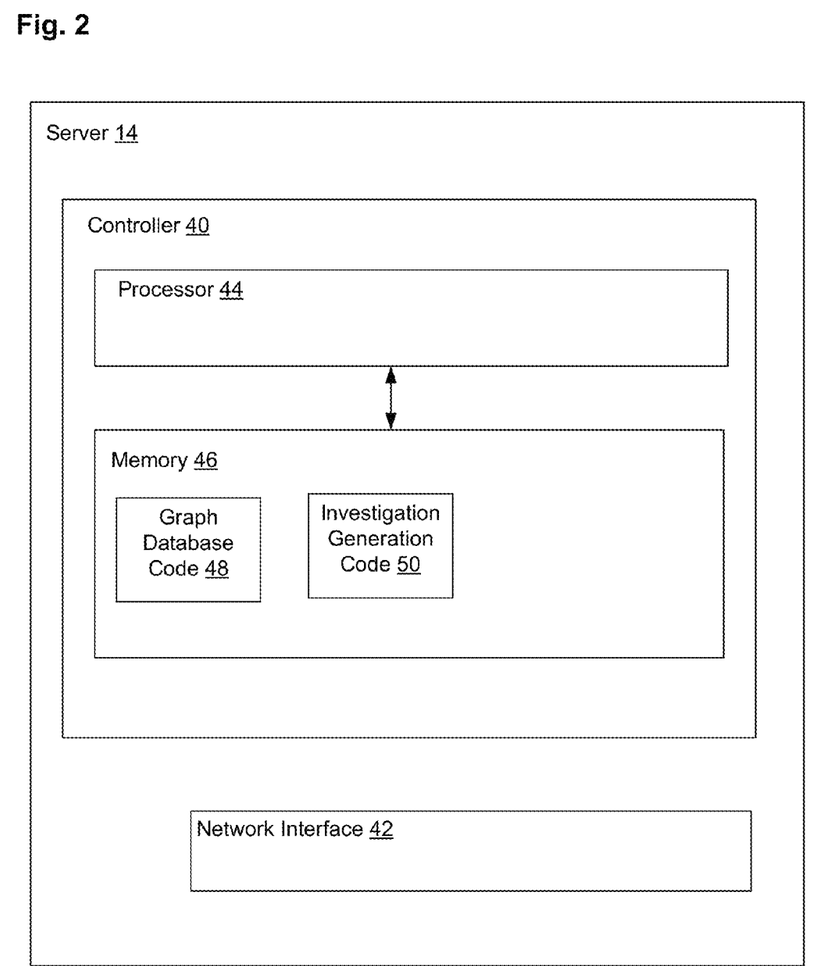
FIG. 2 is block diagram illustrating an example server within the electronic environment shown in FIG. 1.

FIG. 2 illustrates server 14. Server 14 includes controller 40, which in turn includes processor 44 and memory 46, and network interface 42.

Network interface 42 takes the form of an Ethernet card; in some arrangements, network interface 42 takes other forms including that of a wireless receiver or a token ring card, for example.

Memory 46 is configured to store graph database code 48, which includes instructions for generating a graph database 16, and investigation generation code 50 which includes instructions for finding additional investigations according to the improved technique. Memory 46 generally takes the form of, e.g., random access memory, flash memory and/or non-volatile memory.

Processor 44 include a single or multiple cores each capable of running single or multiple threads. Processor 44 is coupled to memory 46 and is configured to execute instructions from graph database code 48 and investigation generation code 50.

Figure 3:
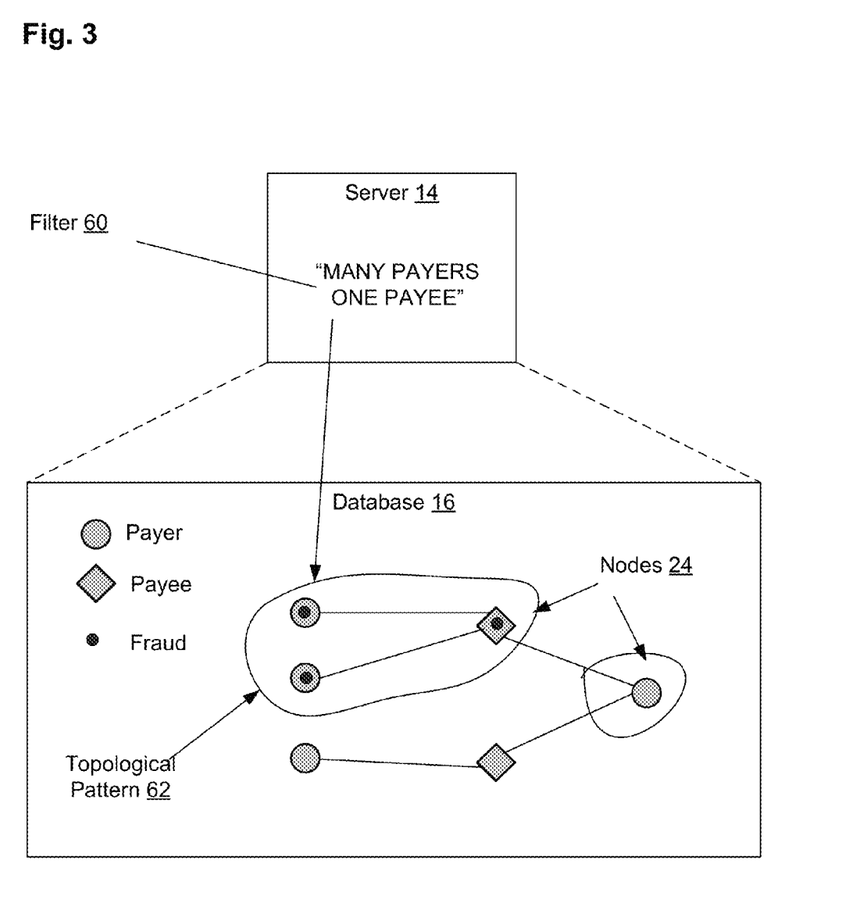
FIG. 3 is a block diagram illustrating an example filter used by the server shown in FIG. 2.

FIG. 3 illustrates additional features of server 14. For example, server 14 provides capability for an analyst to input a filter 60 that describes a pattern of interest to the analyst. In the example illustrated in FIG. 3, an analyst inputs a filter 60 that represents the following logic: "MANY PAYERS ONE PAYEE". In some arrangements, filter 60 follows a textual syntax. When database 16 is a graph database, then filter 60 may be equivalent to a topological pattern 62 in the graph that results from visualizing transaction entries 22.

Upon receiving filter 60, server 14 searches database 16 for topological patterns that satisfy constraints embedded within filter 60. For example, when filter 60 represents "MANY PAYERS ONE PAYEE", server 14 locates all graphical arrangements in which more than one edge terminates on a payee node. Such a filter 60 then allows analysts to quickly study transactions that follow known or suspected patterns of fraud.

Figure 4:
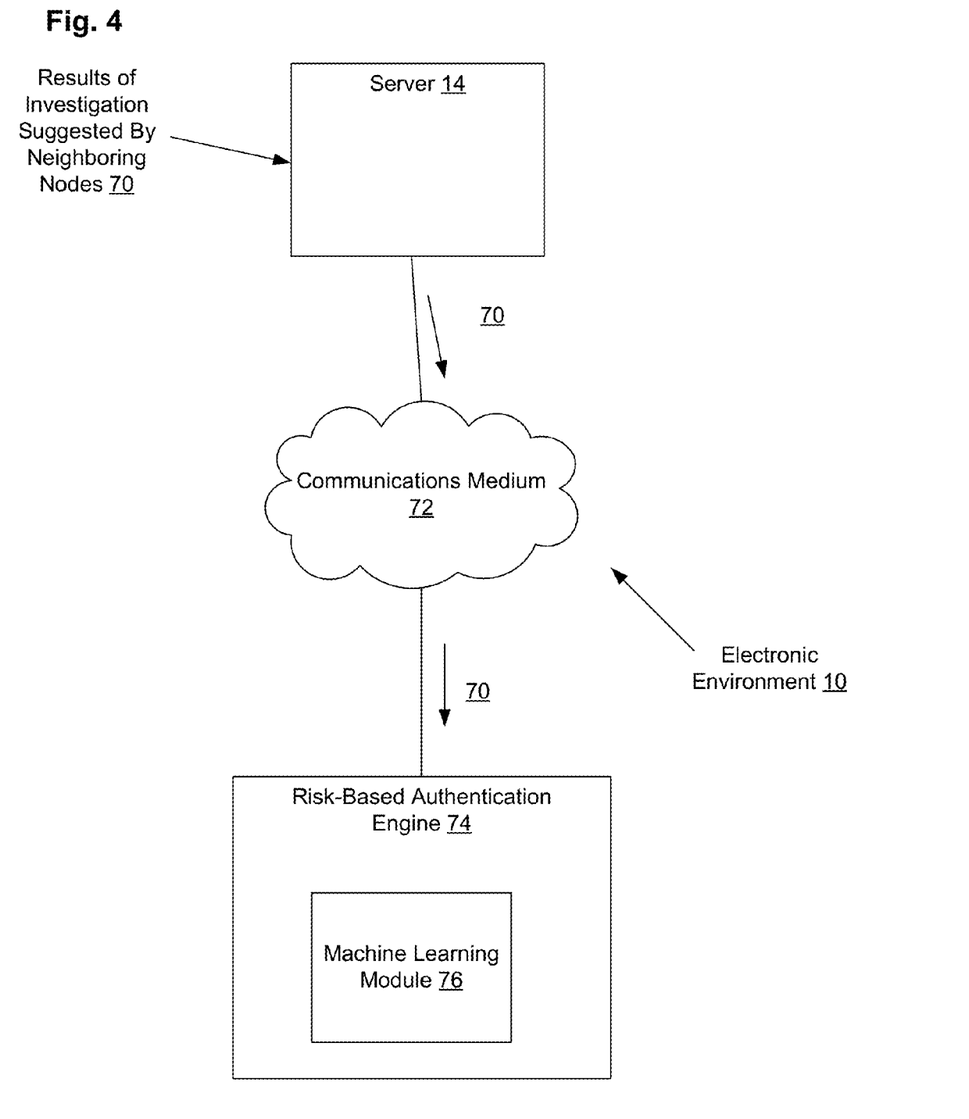
FIG. 4 is a block diagram illustrating an example feedback within the electronic environment shown in FIG. 3.

FIG. 4 illustrates another perspective of electronic environment 10 in which server 14 is in communication with a risk-based authentication engine 74 that produces transaction log 12. Electronic environment 10 further includes communications medium 72.

Communications medium 72 provides network connections between server 14 and risk-based authentication engine 74. Communications medium 72 may implement a variety of protocols such as TCP/IP, UDP, ATM, Ethernet, Fibre Channel, combinations thereof, and the like, depending on whether server 14 is remote or relatively local to risk-based authentication engine 74.

Risk-based authentication engine 74 is configured to assign risk scores to transactions, and store information about the transactions having sufficiently high risk scores in a transaction log. It should be understood that the assignment of risk scores to transactions is based on a model of risk that represents the most current knowledge of what factors affect risk (e.g., geolocation, IP velocity, and the like). Consequently, the value of this model increases with additional data points from the field, i.e., was this transaction deemed a high risk for fraud actually fraudulent? Risk engine 74 may then include a machine learning module 76 for adjusting parameters of the risk model in the face of new data.

During operation, server 14 receives results 70 of investigations—both those directly related to transactions 18 from transaction log 12, as well as new transactions 28 identified by server 14 according to the improved technique. Results 70 may include parameters of the transaction being investigated, e.g., payers, payees, transaction amounts, geolocations, and the like, as well as an indication of whether the transaction was fraudulent or legitimate. Server 14 may encapsulate results 70 in a file having a particular format, e.g., comma-separated values.

Server 14 then sends results 70 via communications medium 72 to machine learning module 76 within risk-based authentication engine 74. Upon receipt of results 70 and other such results, machine learning module 76 runs a machine learning process, e.g., a neural network or genetic algorithm, on these results in order to adjust the risk model to best reflect results 70. Because results 70 have a broader scope than results obtained using a manual investigation protocol, risk models that incorporate results 70 may more accurately reflect the current risk environment.

Figure 5:
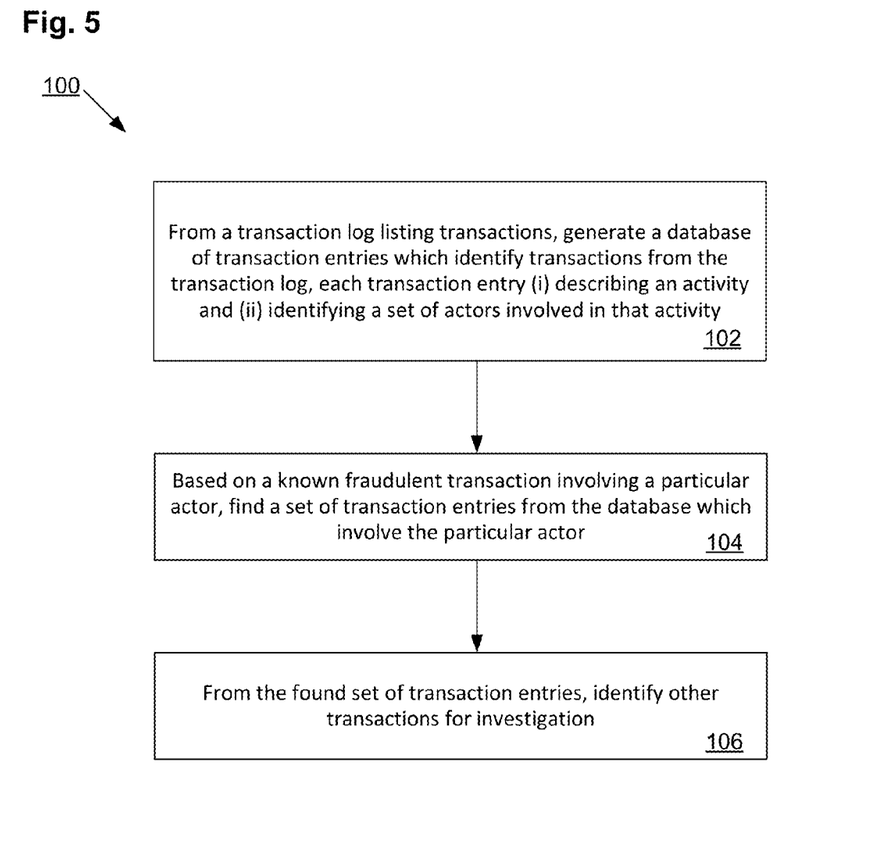
FIG. 5 is a flow chart illustrating an example method of carrying out the improved technique within the electronic environment shown in FIG. 1.

FIG. 5 illustrates a method 100 of providing security, including steps 102, 104, and 106. In step 102, a server, e.g., server 14 generates, from a transaction log, e.g., log 12, listing transactions, e.g., transactions 18, a database, e.g., database 16 of transaction entries, e.g., transaction entries 22, which identify transactions from the transaction log, each transaction entry (i) describing an activity and (ii) identifying a set of actors involved in that activity. In step 104, the server finds, based on a known fraudulent transaction, e.g., transaction 20, involving a particular actor, a set of transaction entries from the database which involve the particular actor. In step 106, the server identifies, from the found set of transaction entries, other transactions, e.g., transactions 28, for investigation.

As used throughout this document, the words "comprising," "including," and "having" are intended to set forth certain items, steps, elements, or aspects of something in that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the above discussion has dealt mainly with a graph database. In some arrangements, however, server 14 may use the improved techniques to generate new transactions for investigations from a non-graphical database from which relationships between entries may be deduced.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of providing security, the method comprising:
    from transaction data which is output from a transaction server that performs transactions, generating, by a fraud investigation server computer, a database of transaction entries which identify transactions performed by the transaction server, each transaction entry (i) describing an activity and (ii) identifying a set of actors involved in that activity;
    based on a known fraudulent transaction involving a particular actor, finding, by the fraud investigation server computer, a set of transaction entries describing activities which involve the particular actor; and
    from the found set of transaction entries, identifying, by the fraud investigation server computer, transactions for investigation; and
    wherein the method further comprises:
        receiving results of an investigation performed on a transaction identified for investigation;
        transmitting the results of the investigation to a machine learning module of an authentication service that identifies fraudulent transactions; and
        adjusting, based on the results of the investigation, a methodology by which the authentication service identifies fraudulent transactions.

2. A method as in claim 1, wherein generating the database of transaction entries includes:
    for each actor of the set of actors involved in an activity, assigning a node of a set of nodes of a graph structure to that actor;
    for each pair of actors of the set of actors involved in the activity, assigning an edge of a set of edges of the graph structure to that pair of actors, that pair of actors being connected by the edge; and
    producing, as a transaction entry, the nodes assigned to each of the set of actors involved in the activity and the edges assigned to each pair of actors of the set of actors involved in the activity; and
    wherein the generated database is a graph database that includes the nodes and edges that are assigned to the actors of the set of actors involved in the activities described by the transaction entries.

3. A method as in claim 2, further comprising:
    assigning a particular node of the graph structure to the particular actor as being involved in the known fraudulent transaction, and
    marking the particular node so as to distinguish the particular node from other nodes of the graph database assigned to other actors of the set of actors that are not involved in the known fraudulent transaction.

4. A method as in claim 3, wherein an edge terminates on a node when the node is one of a pair of nodes connected by the edge;
    wherein finding the set of transactions entries describing activities which involve the particular actor includes:
        locating particular edges terminating on the particular node; and
    wherein identifying the transactions for investigation from the found set of transaction entries includes:
        locating other nodes of the graph database on which the particular edges terminate, the other nodes having been assigned to actors of the set of actors that are not involved in the known fraudulent transaction.

5. A method as in claim 4, wherein identifying the transactions for investigation further includes:
    finding activities in which other actors represented by the located other nodes are involved.

6. A method as in claim 4, wherein each of the set of actors belongs to a group of a set of groups, each of the set of groups indicating a role that an actor belonging to that group plays in an activity in which the actor is involved;
    wherein locating the other nodes of the graph database on which the particular edges terminate includes:
        receiving a logical filter that represents a relationship between a first group of the set of groups and a second group of the set of groups, and
        locating nodes of the set of nodes assigned to actors of the set of actors that satisfy the relationship represented by the logical filter.

7. A method as in claim 6, wherein the logical filter expresses a topological pattern involving nodes and edges within the graph database; and
    wherein locating the nodes of the set of nodes representing the actors of the set of actors that satisfy the relationship represented by the logical filter includes:

performing a search operation within the graph database for nodes and edges that satisfy the topological pattern expressed by the logical filter.

8. An apparatus constructed and arranged to provide security, the apparatus comprising:
a network interface;
memory; and
a controller including controlling circuitry, the controlling circuitry being constructed and arranged to:
generate, from transaction data which is output from a transaction server that performs transactions, a database of transaction entries which identify transactions performed by the transaction server, each transaction entry (i) describing an activity and (ii) identifying a set of actors involved in that activity;
find, based on a known fraudulent transaction involving a particular actor, a set of transaction entries which involve the particular actor; and
identify, from the found set of transaction entries, transactions for investigation; and
wherein the controlling circuitry is further constructed and arranged to:
receive results of an investigation performed on a transaction identified for investigation;
transmit the results of the investigation to a machine learning module of an authentication service that identifies fraudulent transactions; and
adjust, based on the results of the investigation, a methodology by which the authentication service identifies fraudulent transactions.

9. An apparatus as in claim 8, wherein the controlling circuitry constructed and arranged to generate the database of transaction entries is further constructed and arranged to:
for each actor of the set of actors involved in an activity, assign a node of a set of nodes of a graph structure to that actor;
for each pair of actors of the set of actors involved in the activity, assign an edge of a set of edges of the graph structure to that pair of actors, that pair of actors being connected by the edge; and
produce, as a transaction entry, the nodes assigned to each of the set of actors involved in the activity and the edges assigned to each pair of actors of the set of actors involved in the activity; and
wherein the generated database is a graph database that includes the nodes and edges that are assigned to the actors of the set of actors involved in the activities described by the transaction entries.

10. An apparatus as in claim 9, wherein the controlling circuitry is further constructed and arranged to:
assign a particular node of the set of nodes to the particular actor as being involved in the known fraudulent transaction, and
mark the particular node so as to distinguish the particular node from other nodes of the set of nodes assigned to other actors of the set of actors that are not involved in the known fraudulent transaction.

11. An apparatus as in claim 10, wherein an edge terminates on a node when the node is one of a pair of nodes connected by the edge;
wherein the controlling circuitry constructed and arranged to find the set of transactions entries describing activities which involve the particular actor is further constructed and arranged to:
locate particular edges terminating on the particular node; and
wherein the controlling circuitry constructed and arranged to identify the transactions for investigation from the found set of transaction entries is further constructed and arranged to:
locate other nodes of the graph database on which the particular edges terminate, the other nodes having been assigned to actors of the set of actors that are not involved in the known fraudulent transaction.

12. An apparatus as in claim 11, wherein the controlling circuitry constructed and arranged to identify the transactions for investigation is further constructed and arranged to:
find activities in which other actors represented by the located other nodes are involved.

13. An apparatus as in claim 12, wherein each of the set of actors belongs to a group of a set of groups, each of the set of groups indicating a role that an actor belonging to that group plays in an activity in which the actor is involved;
wherein the controlling circuitry constructed and arranged to locate the other nodes of the set of nodes of the graph structure on which the particular edges terminate is further constructed and arranged to:
receive a logical filter that represents a relationship between a first group of the set of groups and a second group of the set of groups, and
locate nodes of the set of nodes representing actors of the set of actors that satisfy the relationship represented by the logical filter.

14. An apparatus as in claim 13, wherein the logical filter expresses a topological pattern involving nodes and edges within the graph database; and
wherein the controlling circuitry constructed and arranged to locate the nodes of the set of nodes representing the actors of the set of actors that satisfy the relationship represented by the logical filter is further constructed and arranged to:
perform a search operation within the graph database for nodes and edges that satisfy the topological pattern expressed by the logical filter.

15. A computer program product comprising a non-transitory, computer-readable storage medium which stores instructions that, when executed by a controller, cause the controller to carry out a method of providing security, the method comprising:
from transaction data which is output from a transaction server that performs transactions, generating, by a fraud investigation server computer, a database of transaction entries which identify transactions performed by the transaction server, each transaction entry (i) describing an activity and (ii) identifying a set of actors involved in that activity;
based on a known fraudulent transaction involving a particular actor, finding, by the fraud investigation server computer, a set of transaction entries describing activities which involve the particular actor; and
from the found set of transaction entries, identifying transactions for investigation; and
wherein the method further comprises:
receiving results of an investigation performed on a transaction identified for investigation;
transmitting the results of the investigation to a machine learning module of an authentication service that identifies fraudulent transactions; and
adjusting, based on the results of the investigation, a methodology by which the authentication service identifies fraudulent transactions.

16. A computer program product as in claim 15, wherein generating the database of transaction entries includes:

for each actor of the set of actors involved in an activity, assigning a node of a set of nodes of a graph structure to that actor;

for each pair of actors of the set of actors involved in the activity, assigning an edge of a set of edges of the graph structure to that pair of actors, that pair of actors being connected by the edge; and producing, as a transaction entry, the nodes assigned to each of the set of actors involved in the activity and the edges assigned to each pair of actors of the set of actors involved in the activity; and wherein the generated database is a graph database that includes the nodes and edges that are assigned to the actors of the set of actors involved in the activities described by the transaction entries.

17. A computer program product as in claim 16, wherein the method further comprises:

assigning a particular node of the graph structure to the particular actor as being involved in the known fraudulent transaction, and marking the particular node so as to distinguish the particular node from other nodes of the graph database assigned to other actors of the set of actors that are not involved in the known fraudulent transaction.

18. A computer program product as in claim 17, wherein an edge terminates on a node when the node is one of a pair of nodes connected by the edge;

wherein finding the set of transactions entries describing activities which involve the particular actor includes:

locating particular edges terminating on the particular node; and wherein identifying the transactions for investigation from the found set of transaction entries includes:

locating other nodes of the graph database on which the particular edges terminate, the other nodes having been assigned to actors of the set of actors that are not involved in the known fraudulent transaction.

19. A method as in claim 1, wherein the authentication service includes a risk engine that outputs risk scores in response to receiving, as input, transaction data; and wherein the method further comprises, prior to generating the database of transaction entries, receiving the transaction data which is output from a transaction server that performs transactions, each of the transactions having risk scores output by the risk engine that are greater than a threshold.

20. A method as in claim 19, wherein generating the database of transaction entries includes, for each transaction:

producing values of fields, the fields including payer identifier, payee identifier, and a fraudulence indicator indicating whether that transaction has been found to be fraudulent;

visually representing each payer identified by the value of the payer identifier with a first node graphic;

visually representing each payee identified by the value of the payee identifier with a second node graphic different from the first node graphic; and marking each of the first node graphic and the second node graphic according to whether the transaction indicator indicates that that transaction was found to be fraudulent; and wherein identifying the transactions for investigation includes, for each transaction entry of the found set of transaction entries:

generating a distance between a marked node and that transaction entry; and comparing the distance to a threshold distance to produce a comparison result indicative of whether that transaction entry is to be identified for investigation.

21. A method as in claim 1, wherein generating the database of transaction entries includes:

for each actor of the set of actors involved in the activity described in a transaction entry, assigning a node of a set of nodes of a graph structure to that actor;

for each pair of actors of the set of actors involved in the activity described in the transaction entry, assigning an edge of a set of edges of the graph structure to that pair of actors, that pair of actors being connected by the edge; and producing, as the transaction entry, the nodes assigned to each of the set of actors involved in the activity and the edge assigned to each pair of actors of the set of actors involved in the activity described in the transaction entry, wherein the generated database is a graph database that includes the nodes and edges that are assigned to the actors of the set of actors involved in the activities described by the transaction entries, wherein finding the set of transactions entries describing activities which involve the particular actor includes locating a particular edge terminating on a particular node, wherein identifying the transactions for investigation from the found set of transaction entries includes locating another node of the graph database on which the particular edge terminates, the other nodes having been assigned to actors of the set of actors that are not involved in the known fraudulent transaction, and wherein the set of actors involved in the activity include at least one of a payer, a payee, a device used to carry out the activity, and a cookie present on the device used to carry out the activity.

\* \* \* \* \*